United States Patent

Berendt et al.

[15] 3,646,637
[45] Mar. 7, 1972

[54] LINK SEPARATOR

[72] Inventors: Gerald C. Berendt, 32 Dale Drive, Chatham Township, N.J. 07928; Leslie B. Melanson, Bay Isle Drive, Point Pleasant, N.J. 08742

[22] Filed: July 30, 1969

[21] Appl. No.: 846,042

[52] U.S. Cl. ................................................17/1 F
[51] Int. Cl. ...........................................A22c 13/00
[58] Field of Search........................................17/1 F

[56] References Cited

UNITED STATES PATENTS 2,463,157  3/1949  Deitrickson ..............................17/1 F
3,156,006  11/1964  Gouba......................................17/1 F

FOREIGN PATENTS OR APPLICATIONS 651,983  11/1962  Canada...................................17/1 F

*Primary Examiner*—Lucie H. Laudenslager
*Attorney*—Popper, Bain, Bobis & Gilfillan

[57] ABSTRACT

A link separator for severing a continuous link or chain of frankfurters or similar articles at successive joining segments comprising a pair of opposed, spaced-apart idler or drag wheels followed by a pair of opposed, spaced-apart, floating, powered feed wheels, the said wheels defining a generally axial path through which a chain of unsevered frankfurters feeds, a mechanical finger on the emergent side of the feed wheels engageable with the frankfurters passing therethrough, the finger deflecting as joining segments pass, a rotary knife positioned to sever the joining segments proximal to the finger, the finger being operatively connected to means controlling the rotary knife in timed relationship to the passage of joining segments, and a pair of spaced-apart, floating, power driven continuous belts on the emergent side of the knife to discharge the severed frankfurters from the apparatus.

10 Claims, 6 Drawing Figures

INVENTORS:
GERALD C. BERENDT
LESLIE B. MELANSON

ATTORNEYS

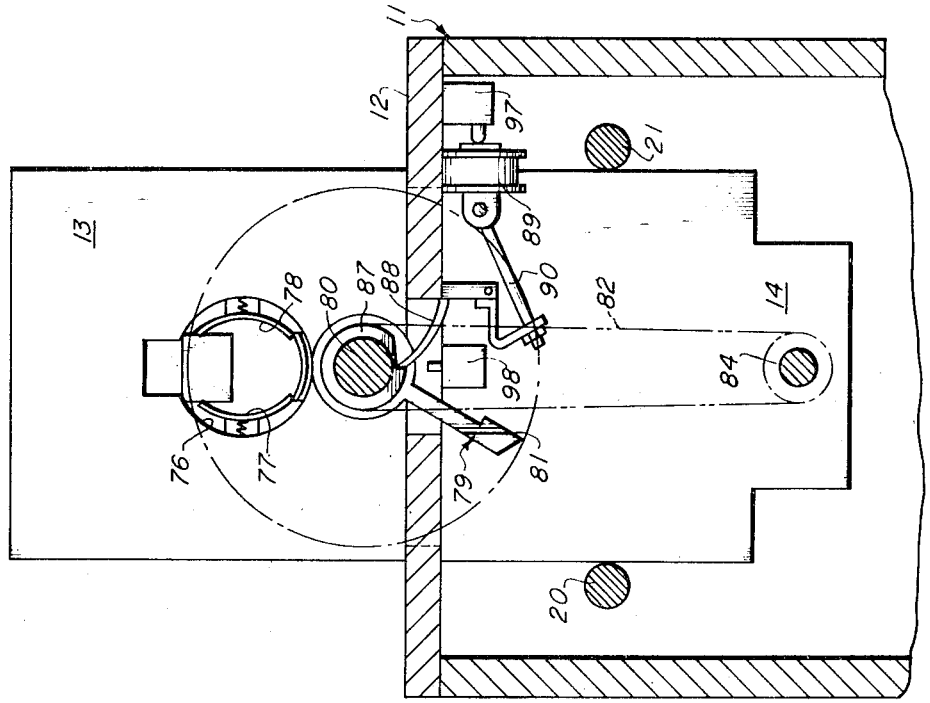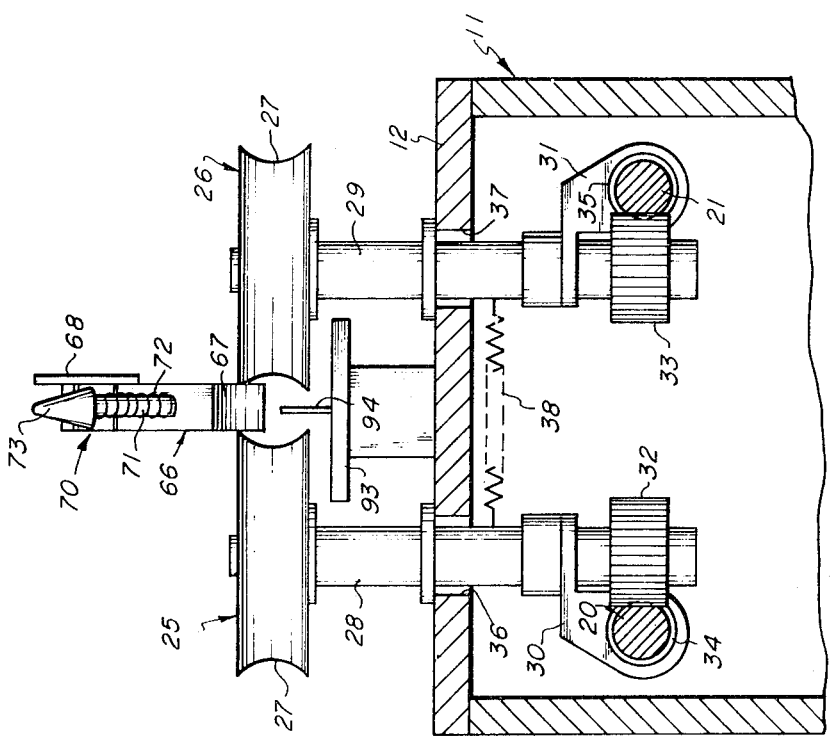

LINK SEPARATOR

BACKGROUND OF INVENTION

Frankfurters or like articles are manufactured by forcing a homogeneous, fluid mass into an elongated casing. The length of the frankfurter is determined by the twisting or tying off of the casing periodically along its length creating individual frankfurters joined by intermediate joining segments.

It is customary to sever a link or chain of frankfurters into individual numbers by hand which is both tedious and time consuming. In order to sever the link or chain automatically, a number of sophisticated problems must be solved.

The principal problem involves the proper timing of the severing means, usually a knife with the passage of the joining segments. This problem is complicated by the fact that there are wide variations in the length of individual frankfurter segments as well as the length of joining segments in any given chain or link. Thus, it is impossible to employ a fixed, timebase for operation of the severing knife. Means must be provided to detect the presence of each joining segment which means actuate a severing knife.

The severing knife must respond within a predetermined, precisely fixed period of time relative to the forward progression of the frankfurter chain. Nevertheless, the knife must have sufficient speed and momentum to sever the joining segments rapidly, without interfering with the forward progression of the chain.

It has also been found that frankfurters tend to bunch as they approach the severing station thereby shortening the joining segment, sometimes sufficiently to cause adjacent frankfurters to touch. This, in turn, makes the timing of the knife too critical with the result that the frankfurter itself may be severed rather than joining segment. Thus, means must be provided to maintain sufficient separation between frankfurters at the severing station.

An excessively long separation between frankfurters also creates problems. If the knife continues to operate while a joining segment is present at the detection station, it will lose timing with respect to subsequent frankfurters. Movement of the knife to effect severance requires a finite period of time. If the knife commences a second movement for the same joining segment it is likely to reach the cutting station after the joining segment has moved on, thereby severing the next frankfurter. Thus, means must be provided to permit only one full movement of the knife for each joining segment detected.

The passage of the last frankfurter in the chain also presents problems. While a frankfurter is yet attached to another frankfurter to its rear, it passes the detection station in a straight line. However, the last frankfurter tends to move out of line, thereby prematurely actuating the severing knife to sever a portion of the last frankfurter. Thus, means must be provided to center the last frankfurter as it passes the detection station.

All of the above problems must be solved by an apparatus which is sufficiently simple and rugged to be operated by unskilled persons who are likely to treat it roughly. In addition, those portions of the machine exposed to food must be easily dismantled for cleaning and be fabricated of material which is nontoxic or attacked by food chemicals.

SUMMARY OF INVENTION

A link separator comprising means for feeding to a severing station a chain of articles joined together by joining segments of reduced dimension, a rotary knife at the cutting station rotatable in a plane generally perpendicular to and across the path of movement of joining segments, a finger engageable with the articles and joining segments proximal to the cutting station, control means for rotating the knife through the arc of fixed length, the finger being operatively connected to the said control means to actuate rotation of the knife when the finger engages a joining segment, the response time of the knife being timed to the axial velocity of the said chain to sever the chain at its joining segment, and means for discharging severed articles from the cutting station.

PREFERRED EMBODIMENT OF INVENTION

The objects and advantages aforesaid, as well as other objects and advantages may be achieved by the link separator claimed herein, a preferred embodiment of which is illustrated in the drawing in which:

FIG. 3 is an end elevational, cross-sectional view the separator taken along line 3—3 in FIG. 1; looking in the direction of the arrows;

FIG. 4 is an end elevational cross-sectional view taken along line 4—4 in FIG. 1 looking in the direction of the arrows;

Figure 1:
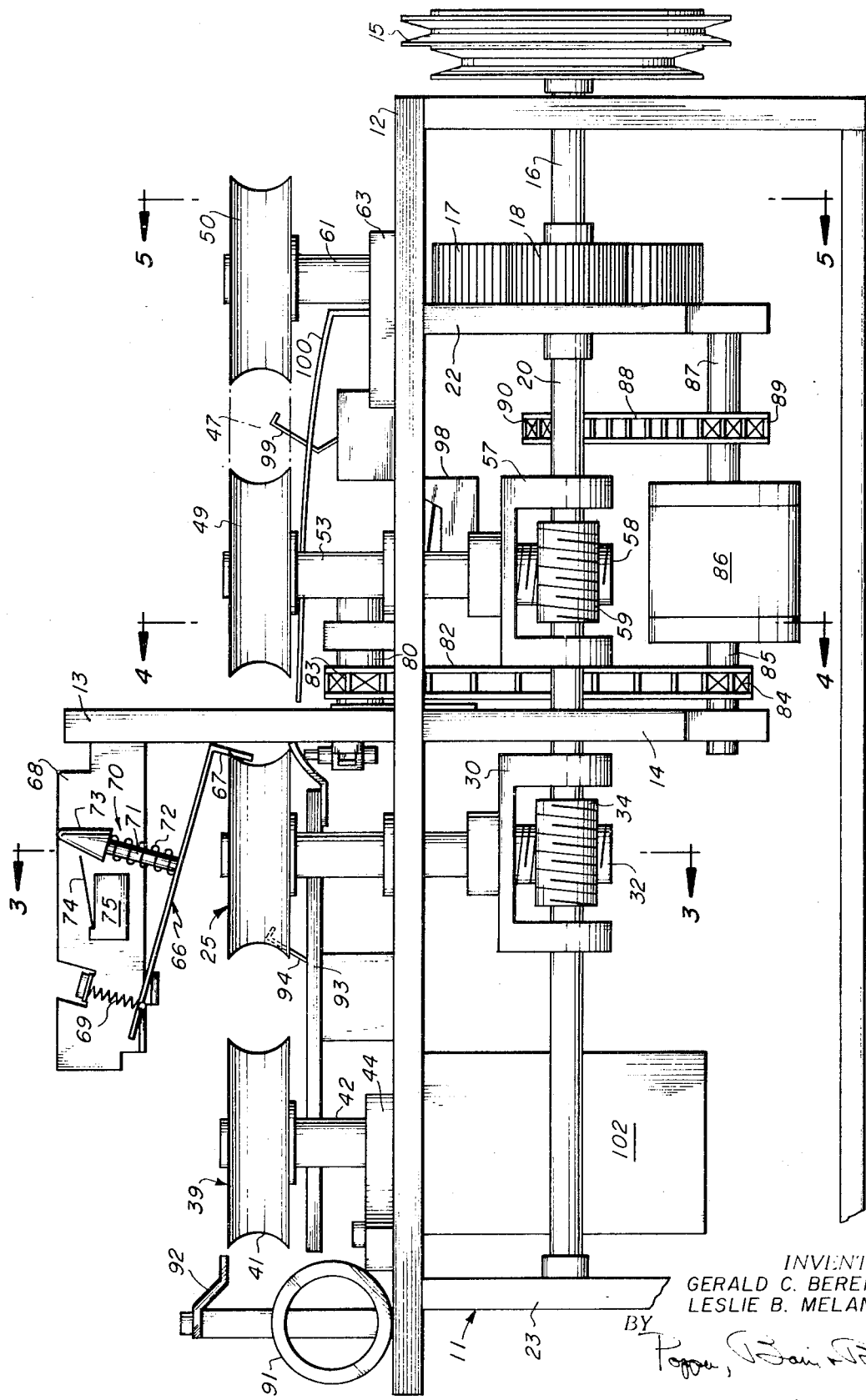
FIG. 1 is a side elevational cross-sectional view of the link separator taken along line 1—1 in FIG. 2 looking in the direction of the arrows.

Referring to the drawings in detail, the link separator comprises a generally rectangular, hollow but closed housing 11 having a top 12. An upstanding wall 13 is mounted on top of the top 12 and a generally vertically depending wall 14 is mounted on the bottom thereof beneath wall 13. The chain of frankfurters enters from the left in FIG. 1 and emerges from the right. The cutting station is located proximal to wall 13.

Figure 2:
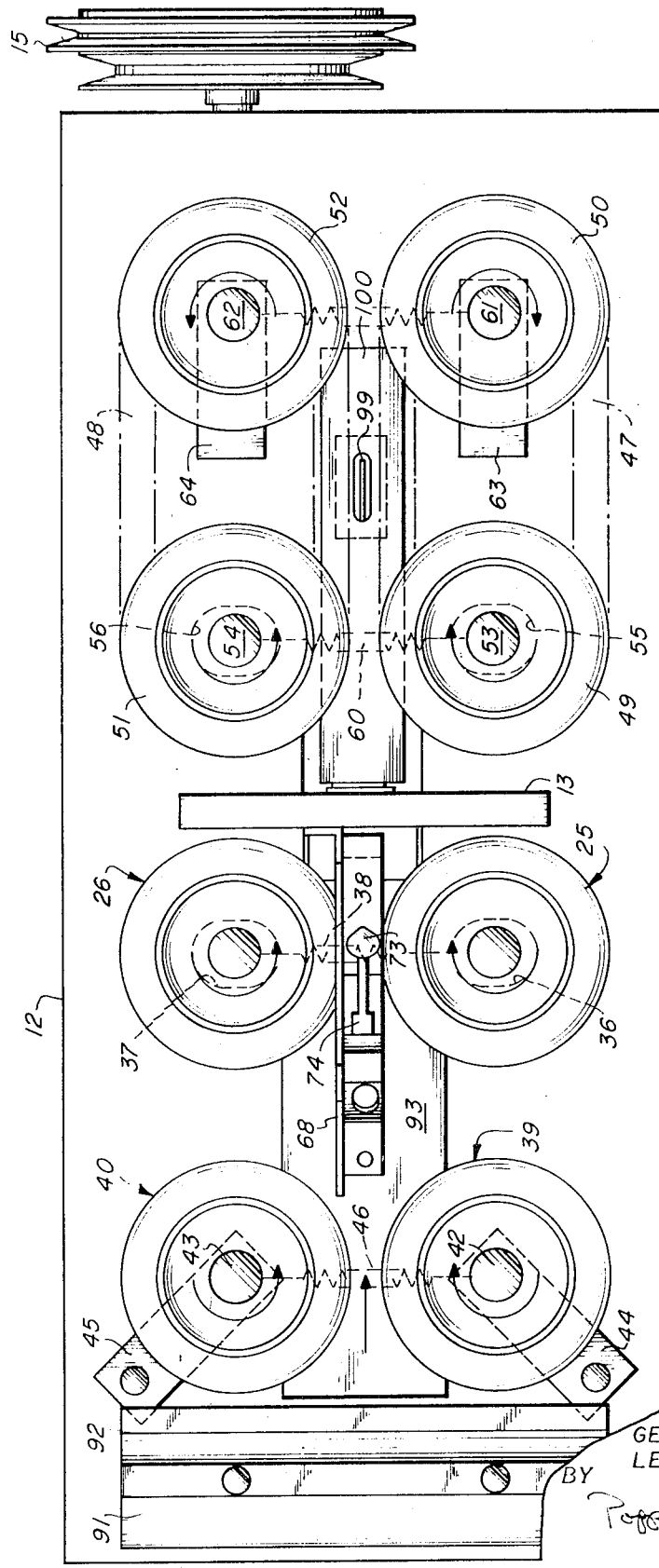
FIG. 2 is a top plan view thereof.
Figure 5:
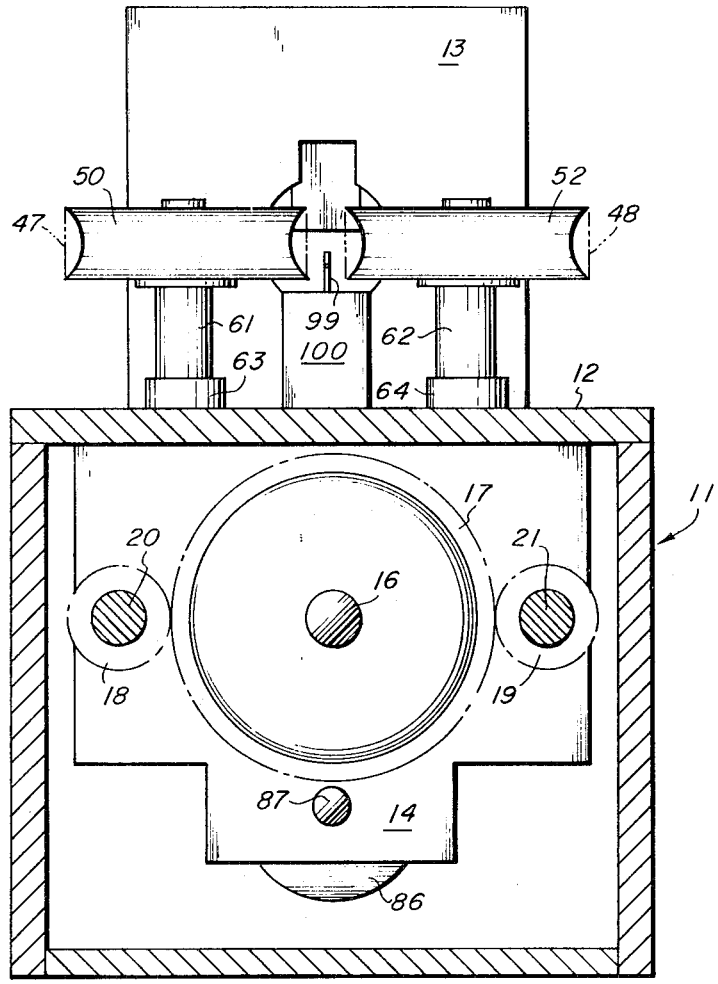
FIG. 5 is an end elevational cross-sectional view taken along line 5—5 in FIG. 1 looking in the direction of the arrows.
Figure 6:
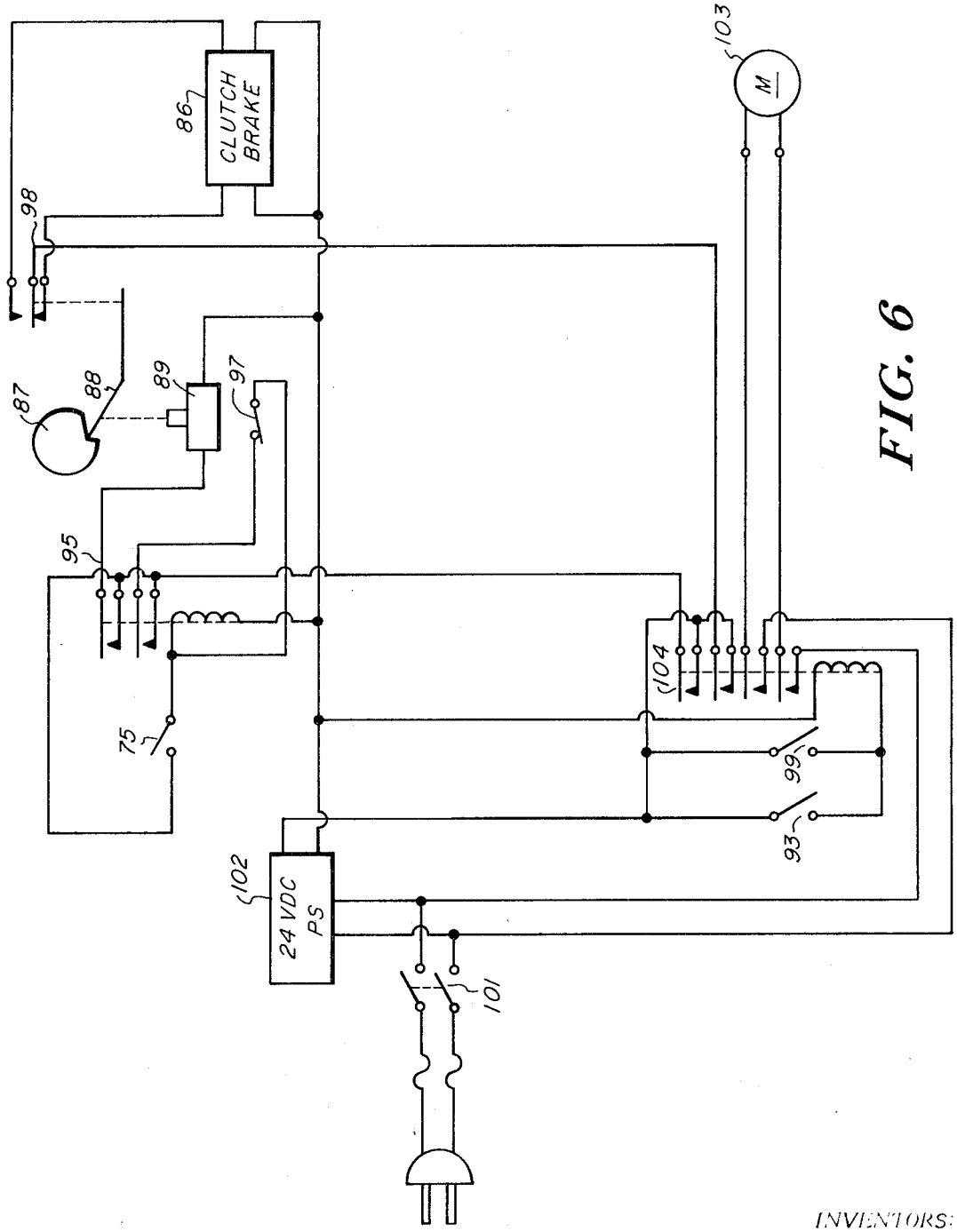
FIG. 6 is a schematic wiring diagram of the circuit controlling the link separator.

Means are provided to feed a chain of frankfurters past the cutting station from left to right in FIGS. 1 and 2. The said means comprise a motor driven external shiv 15 which drives shaft 16 and main drive gear 17. Drive gear 17, in turn, drives a pair of gears 18 and 19 on opposite sides thereof as best illustrated in FIG. 5.

Gears 18 and 19 are coupled to and drive generally parallel, horizontal shafts 20 and 21 respectively. Shafts 20 and 21 are rotatably mounted between depending support wall 22 and end wall 23 of housing 11 extending through depending center wall 14. Shafts 20 and 21 drive means for feeding a chain or link of frankfurters to the cutting station and means for withdrawing the severed frankfurters from the cutting station.

The means for feeding the frankfurters to the cutting station comprise a pair of opposed, spaced-apart, floating, power-driven feed wheels 25 and 26 shown in FIGS. 1, 2 and 3. Each of the feed wheels 25 and 26 is provided with a concave circumferential face 27 to accommodate the cylindrical configuration of the frankfurter. However, the specific configuration of the circumferential face of the drive wheels may be altered to accommodate the configuration or consistency of the articles being fed therebetween.

Each of the feed wheels 25 and 26 is connected to a generally upstanding shaft, respectively 28 and 29 which extends downwardly through slots 36 and 37 in the top 12 of housing 11. Each shaft 28, 29 is rotatably coupled to a yoke respectively 30 and 31 which is in turn rotatably coupled to one of the respective horizontal shafts 20 and 21. Pinion gears 32 and 33 are keyed to shafts 20 and 21 respectively. The pinion gears 32 and 33 are engaged with worm gears 34 and 35 respectively keyed to shafts 20 and 21 respectively.

Since yokes 30 and 31 are rotatably mounted respectively on horizontal shafts 20 and 21, the upstanding shafts 28 and 29 are free to pivot in a vertical plane. Appropriate slots 36 and 37 are provided in the top 12 to permit such movement. A spring 38, is connected between bushings on vertical shafts 28 and 29 normally urging them towards each other. Thus, the feed wheels 25 and 26 are not only power-driven but are spring-loaded to exert pressure on frankfurters passing therebetween. It is also to be noted that horizontal shafts 20 and 21 rotate in opposite directions and hence feed wheels 25 and 26 rotate in opposite directions as shown in FIG. 2.

Drag means are provided to insure a stretching of the joining segments for full separation of the frankfurters as they pass the severing station. The drag means comprise a pair of opposed, rotatable idler wheels 39 and 40 positioned on the feed side of the feed wheels 25 and 26. Idler wheels 39 and 40 lie on the same plane as feed wheels 25 and 26 and define with said feed wheels an axial passage through which the frankfurters pass. The idler wheels 39 and 40 have the same circumferential configuration as feed wheels 25 and 26 and thus are each vested with a concave, circumferential face 41.

Idler wheels 39 and 40 are rotatably mounted on vertical shafts 42 and 43 respectively. Shafts 42 and 43 are mounted upon arms 44 and 45 respectively, which are pivotably mounted on the top 12 of housing 11. Spring 46 is connected between arms 44 and 45 normally urging the idler wheels 39 and 40 toward each other. Optionally limit means may be provided to limit the inward pivotal movement of idler wheels 39 and 40 toward each other. The normal friction introduced by idler wheels 39 and 40 is sufficient to impart a separating motion to the joining segments of the frankfurter chain.

The withdrawal means comprise a pair of opposed, continuous belts 47 and 48 extending in a horizontal plane on the opposite side of the cutting station from the feed wheels 25 and 26. Belt 47 is mounted between wheels 49 and 50 and belt 48 is mounted between wheels 51 and 52. Wheels 49 and 51 are power-driven by horizontal shafts 20 and 21 respectively through a power transmission system identical to that driving feed wheels 25 and 26.

Each of the driven wheels 49 and 51 is keyed to a shaft, respectively 53 and 54, which extends downwardly through appropriate slots 55 and 56 on the top 12 of housing 11. Each of the shafts 53 and 54 is driven by one of the horizontal shafts, 20 and 21 in the same manner. For instance, shaft 53 is rotatably coupled to a yoke 57, which, in turn, is rotatably coupled to a shaft 20. The pinion gear 58, on the bottom of the shaft 53 is engaged to a worm gear 59 on shaft 20. Spring 60 is connected between upstanding shafts 53 and 54 normally urging them together.

Wheels 50 and 52 idle and are mounted on vertical shafts 61 and 62 respectively. Shafts 61 and 62 are mounted on arms 63 and 64 respectively which are pivotably mounted on the top 12 of housing 11. A spring connects arms 63 and 64 normally urging them together.

Means are provided to detect the presence of a joining segment at the cutting station which is located immediately to the right of the upstanding wall 13 in FIG. 1. The said means comprise a spring-loaded finger 66 having a depending offset tip 67. Finger 66 is pivotably mounted on a support 68 which is rigidly mounted on the upstanding center wall 13. A spring 69 biases the end of finger 66 so that the offset tip 67 normally lies in the path of the frankfurters emerging from between feed rollers 25 and 26.

An upstanding switch trip 70 is mounted on top of the finger 66 intermediate its ends. The trip 70 comprises a stantion 71 loosely mounted on the finger 66 having a coil spring 72 mounted thereon. The coil spring 72 is engaged to the finger 66 and a conical tip 73. The bottom of the conical tip 73 is engageable with a microswitch operating lever 74 pivotably mounted to a microswitch 75 when the finger 66 is generally horizontal. As the finger 66 drops, the tip 73 depresses the lever 74 actuating the microswitch 75. However, as the finger 66 drops further, the spring 72 permits the stantion 71 to deflect to the right in FIG. 1 disengaging the tip 73 from the lever 74. This in turn releases microswitch 75. Microswitch 75 must be actuated only momentarily in order to permit the rotary knife 79 to pass through the cutting station only once during the passage of each joining segment.

The cutting station is illustrated in detail in FIG. 4. Frankfurters emerging from the feed wheel 25 and 26 pass through an opening 76 in the upstanding wall 13. A pair of vertically oriented, opposed, arcuate, spring loaded centering guides 77 and 78 are located in the opening 76.

A rotary knife 79 is mounted on shaft 80 for rotation in a vertical plane, the cutting edge 81 of the knife 79 passing through the axis of opening 76. Shaft 80 is driven through a chain 82 coupling a gear 83 on shaft 80 and a second gear 84 on output shaft 85 of a magnetic clutch-brake 86. The input shaft 87 of clutch-brake 86 is driven by a chain 88 connecting gear 89 on shaft 87 and gear 90 on shaft 21. The clutch-brake 86 is actuated by means of microswitch 75 which in turn is actuated by movement of finger 66.

The knife 79 rotates in a counterwise direction in FIG. 4. There is a finite reaction time for the knife edge 81 to travel from the rest position through the cutting point at the axis of opening 76. This reaction time is critical and must be maintained within narrow limits otherwise there will be a dissynchronization between the passage of the knife edge 81 and the joining segments.

Since the reaction time is governed by the length of the arc that the knife edge 81 must travel, the arc distance must be accurately governed. The clutch-brake 86 cannot arrest movement of a knife 79 with sufficient accuracy. Thus, control means are provided to arrest movement of the knife 79.

The said knife control means comprise a cam 87 having a radial face engageable with a pivotable arm 88. The arm 88 is pivoted by a solenoid 89 through a connecting rod 90. When the solenoid 89 is energized, the connecting rod 90 pivots arm 88 to release the cam 87. Simultaneously, the clutch-brake 86 energizes the rotary blade 79 to rotate through the joining segment. In addition, the solenoid 86 immediately returns the pivotal arm 88 to its base position where it engages the discontinuity in can 87 to arrest rotary blade 79 in its rest position.

In operation, frankfurters are fed between a cylinder 91 and a guide 92 immediately to the left of the idler rollers 39 and 40 in FIG. 1. The frankfurters are then pushed between idler rollers 39 and 40 over a support platform 93. Between the idler rollers 39 and 40 and feed rollers 25 and 26 there is a microswitch lever 94 which senses the presence of a frankfurter being slid along the support platform 93 between the respective pairs of rollers. This microswitch lever 94 is adapted to close a latching relay 95 which energizes the apparatus and in particular the feed rollers 25 and 26. The feed rollers 25 and 26 pick up the lead frankfurter of the chain passing it therebetween and through the opening 76 in wall 73 between guides 77 and 78.

As the first joining segment passes beneath the offset tip 67, the finger 66 drops actuating microswitch 75 which in turn actuates indicating relay 96. When the indicating relay 96 is energized solenoid 89 is energized causing pivotal arm 88 to free cam 87. Simultaneously the clutch-brake 86 is energized rotating the knife 79.

As there has been indicated previously, the knife 79 cannot be permitted to rotate past the cutting station more than once for each joining segment. This is insured by means of the cone 73 which will actuate lever 74 as the finger 66 descends. The spring 71 permits the shaft 70 to tip to one side so that the cone 73 disengages lever 74 thereby returning microswitch 75 to its rest position. It is necessary to return the pivotal arm 88 to the rest position to engage the discontinuity on cam 87 thereby arresting the rotation of rotary blade 79 at its rest position.

There is also a switch 98 actuated by rotation of the cam 87. When the flat of the cam 87 is reached mechanical switch 98 coupled with the lever 88 deenergizes the clutch-brake 86. Of course, the cam 87 continues to rotate until the discontinuity engages the tip of the pivotal arm 88. Thus, means are provided to energize the rotation of the blade or knife 79 when the joining segment is detected at the cutting station as well as means to arrest movement of the knife 79 after it passes through the cutting station only once.

As the last frankfurter passes lever 94 of microswitch 93, means must be provided to continue operation of the withdrawing means until the last frankfurter has been discharged. Such means comprise a lever for microswitch 99 extending upwardly through a support platform 100 between the belts 47 and 48. Obviously, microswitch 99 will be closed until the last frankfurter has been discharged from between belts 47 and 48. Microswitch 99 maintains energy to the apparatus while depressed insuring full power until the last frankfurter has been withdrawn.

A main on-off switch 101 may be provided to supply energy to a conventional 24-volt DC power source 102. The shiv 15 is driven by motor 103 activated by relay 104 and is maintained in operation by closure of microswitch 99 through the same relay 104 until the last frankfurter has cleared the apparatus.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

We claim:

1. A link separator comprising,
   a. means for continuously feeding to a severing station a chain of articles joined together by joining segments of reduced dimension,
   b. a radially elongated, relatively thin knife rotatable through an arc of 360° in a plane intersecting the path of movement of the joining segments, at least a portion of the knife passing through the path of movement of each joining segment at the severing station,
   c. a movable finger engageable with the articles immediately proximal to the severing station on the side from which the articles eminate,
   d. control means for initiating and positively arresting rotation of the knife at precisely the same predetermined angular position for each passage of a joining segment past the severing station,
   e. the finger being operatively connected to said control means to initiate rotation of the knife when the finger moves to engage a joining segment,
   f. the response time of the knife being timed to the axial velocity of the chain of articles to sever the chain at each of its joining segments, and
   g. means for discharging severed articles from the severing station.

2. A link separator comprising,
   a. the structure in accordance with claim 1, and
   b. a generally upstanding, axially tiltable self-erecting post mounted on top of the finger,
   c. a radially enlarged tip on top of the post, the tip having a cam surface on one side and a generally flat bottom, the bottom of the top being engageable with switch actuating means, the switch being operatively connected to the said control means,
   d. the bottom of the post disengaging the actuating means after actuationing the same,
   e. the post tilting on the finger in response to engagement of the said cam surface with the said actuating means as the finger engages each article until the bottom of the tip becomes reengagable with said actuating means.

3. A link separator comprising,
   a. the structure in accordance with claim 1, and
   b. a rotatable shaft, one end of the knife being mounted on the shaft for rotation therewith,
   c. continuously operating power means for driving said shaft,
   d. transmission operatively connected between said power means and shaft, the transmission means including intermittantly engageable clutch means,
   e. the said control means being operatively connected to the said shaft.

4. A link separator comprising,
   a. the structure in accordance with claim 3 in which
   b. the said control means are a cam mounted on the said shaft for rotation therewith, and
   c. an abrupt discontinuity on the cam,
   d. means to engage and disengage the said discontinuity operable in response to a signal generated by movement of the finger to engage a joining segment.

5. A link separator comprising,
   a. the structure in accordance with claim 1 in which
   b. the said means for continuously feeding the chain of articles is at least one pair of opposed, power-driven, contrarotating members normally spaced apart a distance less than the average width of said articles passing therebetween, and
   c. resilient means normally urging at least one of the said contrarotating members toward the other.

6. A link separator comprising,
   a. the structure in accordance with claim 5 in which
   b. both of the said contrarotating members is limitedly movable toward and away from the path of movement of the articles,
   c. the said resilient means normally urging each of the said contrarotating members toward each other.

7. A link separator comprising,
   a. the structure in accordance with claim 1 in which
   b. the said means for discharging severed articles from the severing station are at least one pair of opposed, power-driven, contrarotating members normally spaced apart a distance less than the average width of said articles passing therebetween, and
   c. resilient means normally urging at least one of the said contrarotating members toward the other.

8. A link separator comprising,
   a. the structure in accordance with claim 7 in which
   b. both of the said contrarotating members is limitedly movable toward and away from the path of movement of the article,
   c. the said resilient means normally urging each of the said contrarotating members toward each other.

9. A link separator comprising,
   a. the structure in accordance with claim 7 in which
   b. the said means for continuously feeding the chain of articles is at least one pair of opposed, power-driven, contrarotating members normally spaced apart a distance less than the average width of said articles passing therethrough.

10. A link separator comprising,
    a. the structure in accordance with claim 9 in which
    b. both the contrarotating members of the feeding means and the contrarotating members of the discharge means are limitedly movable toward and away from the path of movement of the articles, and
    c. each of the said resilient means normally urge each of the respective contrarotating members of the feeding means and the discharge means toward each other.

* * * * *